May 16, 1961 A. W. SMALL 2,984,700

METHOD AND APPARATUS FOR CRYPTOGRAPHY

Filed Sept. 22, 1944 5 Sheets-Sheet 1

ALBERT W. SMALL
INVENTOR
By: William D. Hall
Attorney

May 16, 1961 A. W. SMALL 2,984,700

METHOD AND APPARATUS FOR CRYPTOGRAPHY

Filed Sept. 22, 1944 5 Sheets-Sheet 2

ALBERT W. SMALL
INVENTOR

By: William D Hall
Attorney

ALBERT W. SMALL
INVENTOR
By: William D. Hall
Attorney

ALBERT W. SMALL
INVENTOR
By: William D. Hall
Attorney

METHOD AND APPARATUS FOR CRYPTOGRAPHY

Filed Sept. 22, 1944 5 Sheets-Sheet 5

ALBERT W. SMALL
INVENTOR
By: William D. Hall.
Attorney

United States Patent Office 2,984,700

Patented May 16, 1961

2,984,700

METHOD AND APPARATUS FOR CRYPTOGRAPHY

Albert W. Small, Washington, D.C.
(5803 Green Tree Road, Bethesda 14, Md.)

Filed Sept. 22, 1944, Ser. No. 555,402

18 Claims. (Cl. 178—22)

(Granted under Title 35, U.S. Code (1952), sec. 266)

The invention described herein may be manufactured and used by or for the Government for governmental purposes, without the payment of any royalty thereon.

This invention relates to cryptography and more particularly to highly secret methods of cryptography.

In the art of cryptography, it is common to change the letters (or other symbols) to different letters or symbols for the purpose of transmitting them. The party receiving the communication translates the coded or ciphered message to its original form. Generally a "key" is used to cipher and decipher the message.

The primary object of this invention is to provide a highly secret coding method which cannot be solved by merely finding a "key." Other objects of my invention will become apparent as this description proceeds.

With my invention, part of the symbols are ciphered twice or more, whereas the remainder are ciphered only once. Whether a particular symbol is to be ciphered only once or more than once depends upon the principle of operation of the ciphering machine and its adjustment.

In this art, a distinction is usually recognized between "coding" a message and "ciphering" one, but the principles of my invention are equally applicable to both. The words will be used interchangeably, therefore, and, in specification and claims, should be considered equivalents.

The present application is a continuation in part of my application for patent filed March 10, 1941, Serial No. 382,561.

Figure 1:
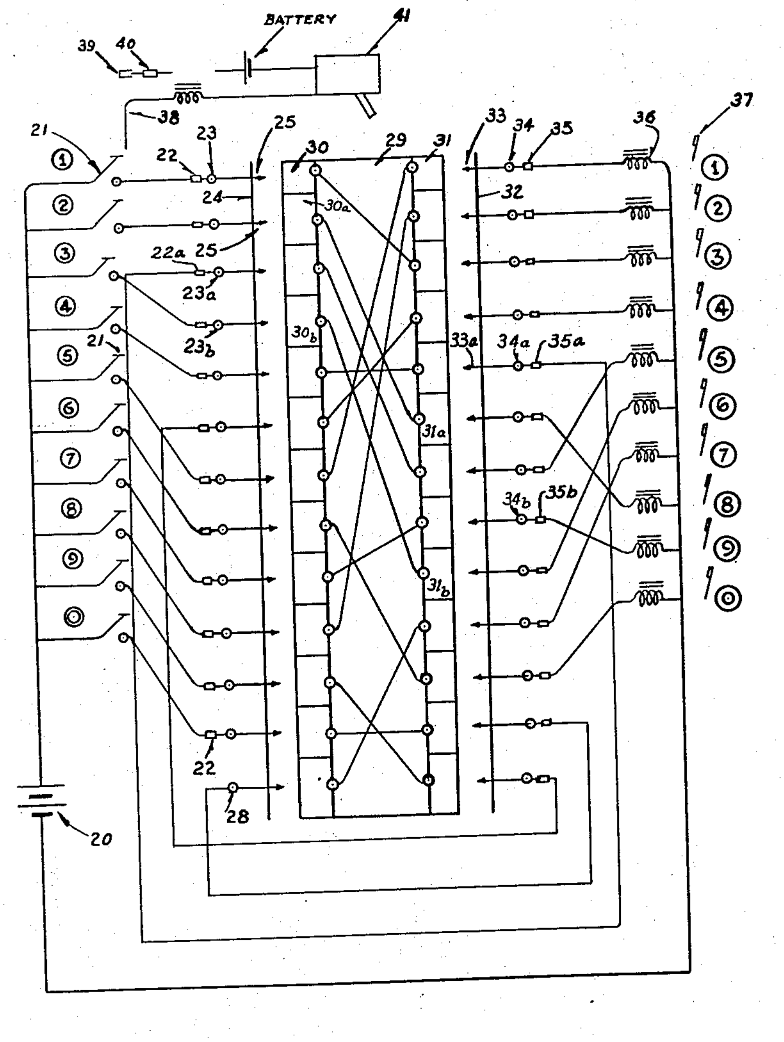
Figure 1 is a schematic view of one form of my invention with the end plates and the character displacing commutator shown in developed form. Plugs and jacks are used for certain connections.

In Figure 1, there is shown a system for transmitting numbers, say 1, 2, 3, 4, 5, 6, 7, 8, 9, and 0, in a secret form. A transmitting keyboard includes a plurality of keys, such as 21, respectively designated 1 to 0, each being arranged to close a circuit from battery 20 to an input plug, such as 22, when depressed. A character displacing commutator 29 has input segments 30 and output segments 31 respectively randomly connected so that each of the input segments connects to only one of the output segments. An end plate 24 supports a plurality of brushes, such as 25, each of which is electrically energized from a jack, such as 23. In similar fashion, an output end plate 32 has a plurality of brushes, such as 33, connected to jacks, such as 34. A plurality of output plugs, such as 35, electrically connect to a plurality of solenoids as at 36 that respectively operate a plurality of keys as at 37. These keys print numbers 1, 2, 3, 4, 5, 6, 7, 8, 9, 0 respectively. A bar 38 is operated each time any key such as 21 is depressed and closes a circuit at contacts 39 and 40 and thereby causes apparatus 41 to rotate the commutator 29 one or more spaces.

With the commutator 29 in the position shown in Figure 1, if key #1 is depressed, type printer #3 is actuated. Also the bar 38 is operated causing the apparatus 41 to advance the commutator 29 one space for example, in a clockwise direction (when viewed from the left). If key #1 is again depressed the printer #0 will be actuated this second time. With ordinary devices of the prior art, the output numbers are displaced from the input numbers according to some simple law, such as a particular law depending on how the apparatus 41 advances the commutator 29. From time to time in my machine, however, an input number is ciphered two or more times; that is to say, it goes through the character-displacing commutator 29 at least twice. To illustrate, suppose the commutator 29 is advanced until input segment **30*a* is in contact with the brush of #1 key. In this case the path of current through the machine is from the key 1 to the plug 22, jack 23, brush 25, segment 30*a*, segment 31*a*, brush 33*a*, jack 34*a*, output plug 35*a*, input plug 22*a*, jack 23*a*, segment 30*b*, segment 31*b*, jack 34*b*, and output plug 35*b* to the printer #9**. Since the input symbols are ciphered once part of the time and more than once in other instances, the solution of the ciphered message is very difficult.

The various input plugs may be plugged into the several input jacks in any order, and similarly the output plugs may be inserted in the output jacks in any order. These facts enable a very large number of different adjustments of the machine. The order of plugs can be changed from time to time in order to confuse anyone trying to intercept the messages.

The party receiving the message may translate the same by use of a similar machine, provided he plugs his input and output plugs 22 and 35 in the output and input jacks 34 and 23, respectively, that correspond in order to the plug order used by the person ciphering the message.

Figure 2:
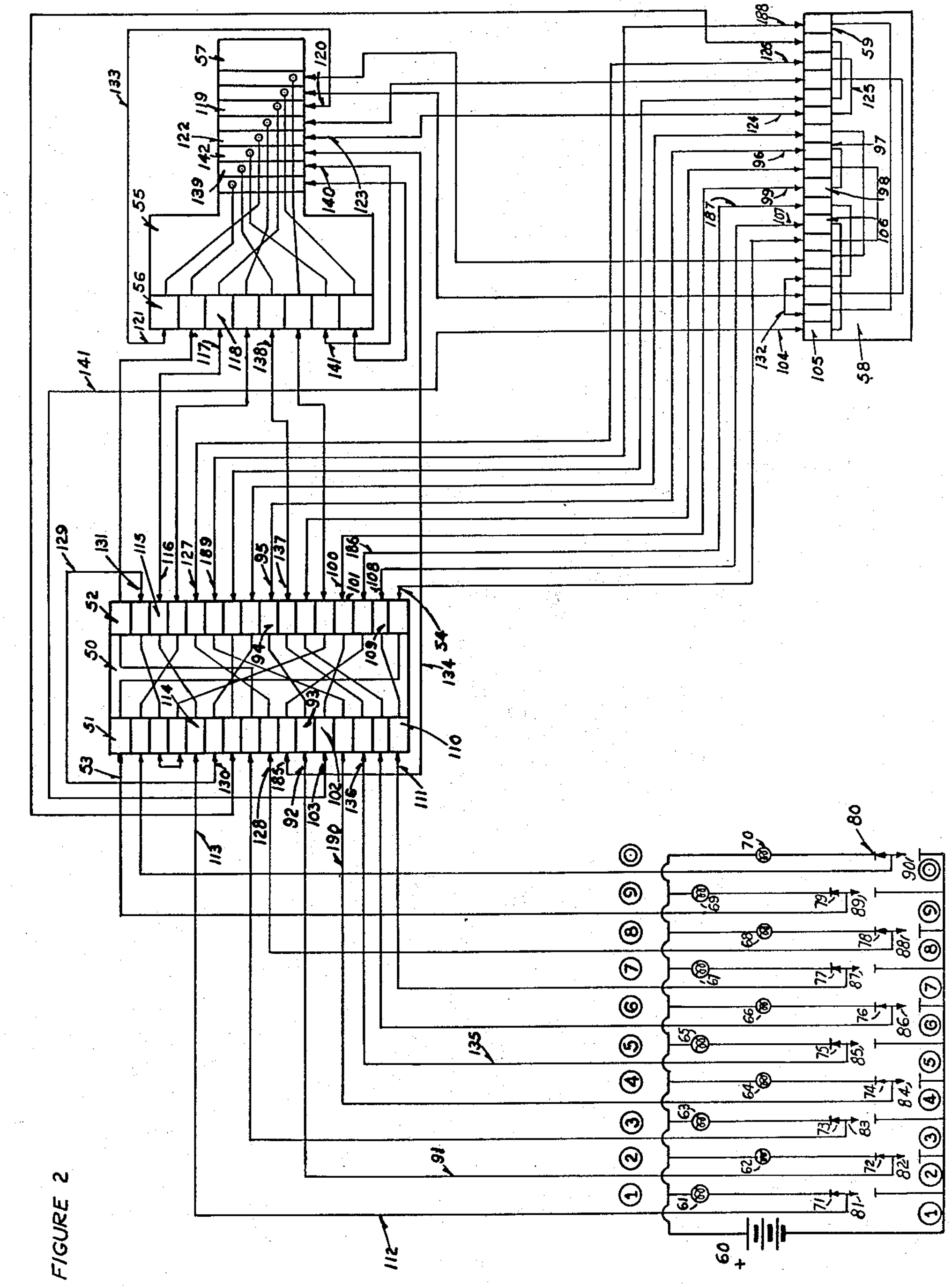
Figure 2 is a schematic view of a more complicated form of my invention.

In Figure 2 there is shown a character displacing element 50, input section commutator segments such as 51, and output segments such as 52. The plurality of input brushes, such as 53, and output brushes, such as 54, respectively, cooperate with the segments such as 51 and 52. The commutators and associated brushes form one character displacing element. A second character displacing element 55 comprises a commutating portion 56 each contact of which, as 118, is connected to a different slip ring of portion 57. A third character displacing element 58 comprises a plurality of commutating segments 59 randomly connected to each other. All three character-displacing elements are rotated according to any desired law; for example, the element 50 may be rotated one segment each time a circuit is made through the battery 60, and the element 55 may be rotated according to the time of day, etc. A plurality of indicating lamps 61 to 70, inclusive, are respectively connected to poles 71 to 80, inclusive, of single pole double-throw switches 81 to 90, inclusive. The other poles of these switches are all connected to the negative side of the battery 60. The positive side of the battery 60 is connected to the remaining sides of the indicating lamps 61 to 70, inclusive.

The purpose of the machine shown in Figure 2 is to cipher a message by operation of the switches 81 to 90, and have the resultant ciphered message indicated by the lamps 61 to 70 according to a predetermined law. This law is inherent in the machine, and, accordingly, the message may be deciphered by any other person having a similar machine, provided the second machine is adjusted to operate in the same manner as the first machine. In place of the lamps 61 to 70, suitable solenoids may be substituted, and arranged to control typewriter keys so that the output indications are not only indicated, but also recorded in the form of a typed message. The various keys and lamps may be marked by suitable letters or numbers, as 1, 2, 3, 4, 5, 6, 7, 8, 9, 0. If it is desired to send letters instead of numbers, twenty-six keys and twenty-six lamps may be provided so that the entire alphabet may be sent. Should it be desired to send both letters and numbers, thirty-six keys and lamps should be provided. In event more than ten keys are used, the number of segments on the commutators and the number of slip rings preferably should be increased to take care of the added letters.

If it is desired to cipher the number "21" on the machine shown in Figure 2, the operation would be as follows, assuming that none of the commutators were advanced during the ciphering procedure. Upon depressing the key designated "2" and closing the switch 82, current would flow from the negative pole of the battery 60 to the key 82, wire 95, brush 92, segment 93, segment 94, brush 95, brush 96, segment 97, segment 98, brush 99, brush 100, segment 101, segment 102, brush 103, wire 141, brush 104, segment 105, segment 106, brush 107, brush 108, segment 109, segment 110, brush 111, switch 87, pole 77, lamp 67, and back to the positive pole of the battery 60. Lamp 67 indicates number "7". It can be seen that the current passed through the commutating element 50 three times and through the element 58 two times. Ordinarily, after depressing each key, one or more of the commutating elements would be rotated one or more spaces. If none of these elements were caused to rotate, however, (and this is assumed), a circuit would be made as follows upon depressing the key designated "1" and closing the switch 81 to cipher the number "1": from the negative pole of the battery 60 to the switch 81, wire 112, brush 113, segment 114, segment 115, brush 116, brush 117, segment 118, slip ring 119, brush 120, wire 133, brush 121, slip ring 122, brush 123, brush 124, wire 125, brush 126, brush 127, brush 128, switch 88, pole 78, lamp 68, and back to the positive pole of the battery 60. Hence, lamp "8" is energized. The ciphered text for "21" is therefore "78" in the position and adjustments shown and described.

Wire 129, associated with the character-displacing element 50, is a so-called feed-back connection which, at times, causes current entering brushes 130 and 131 to pass through character-displacing element 50 an additional time. Similarly, character-displacing element 58 has a feed-back connection 132, which causes feed-back operation in that element. As previously described in detail, a feed-back wire 133 is associated with character-displacing element 55. There are also feed-back connections (see 134) connecting the output of element 55 to the input of element 50. The operation of this feed-back connection may be observed by tracing the circuit when a key associated with the switch 85 is depressed in order to cipher the number "5". The current path is as follows: through the battery 60, switch 85, wire 135, brush 136, brush 137, brush 138, slip ring 139, brush 140, brush 141, slip ring 142, feed-back wire 134, brush 185, brush 186, brush 187, feed-back wire 132, brush 188, brush 189, brush 190, pole 74, lamp 64, and back to the battery 60.

As was previously explained in connection with switch 82, a feed-back wire 141 connects the output of character displacing element 58 with the input of character displacing element 50, and consequently, whenever segment 105 of character displacing element 58 is energized, the current is fed back into the input of character displacing element 50 and reciphered for the second time by character displacing element 50. It will be seen that the output of each character displacing element has at least one connection to the input of each of the other two elements; there are, therefore, not only recipherments accomplished by fed-back connections on each element, but also recipherments by feed-back connections from other elements. The arrangement ciphers a message according to a mathematical law so complicated that it is almost impossible for anyone intercepting the message to decipher the same using any of the present methods of breaking messages down mathematically. As was explained in connection with Figure 1, plugs and jacks are used in connection with the various brushes, and this enables a large number of adjustments to be made, each giving the machine a different ciphered result for a given plain text message.

Figure 3:
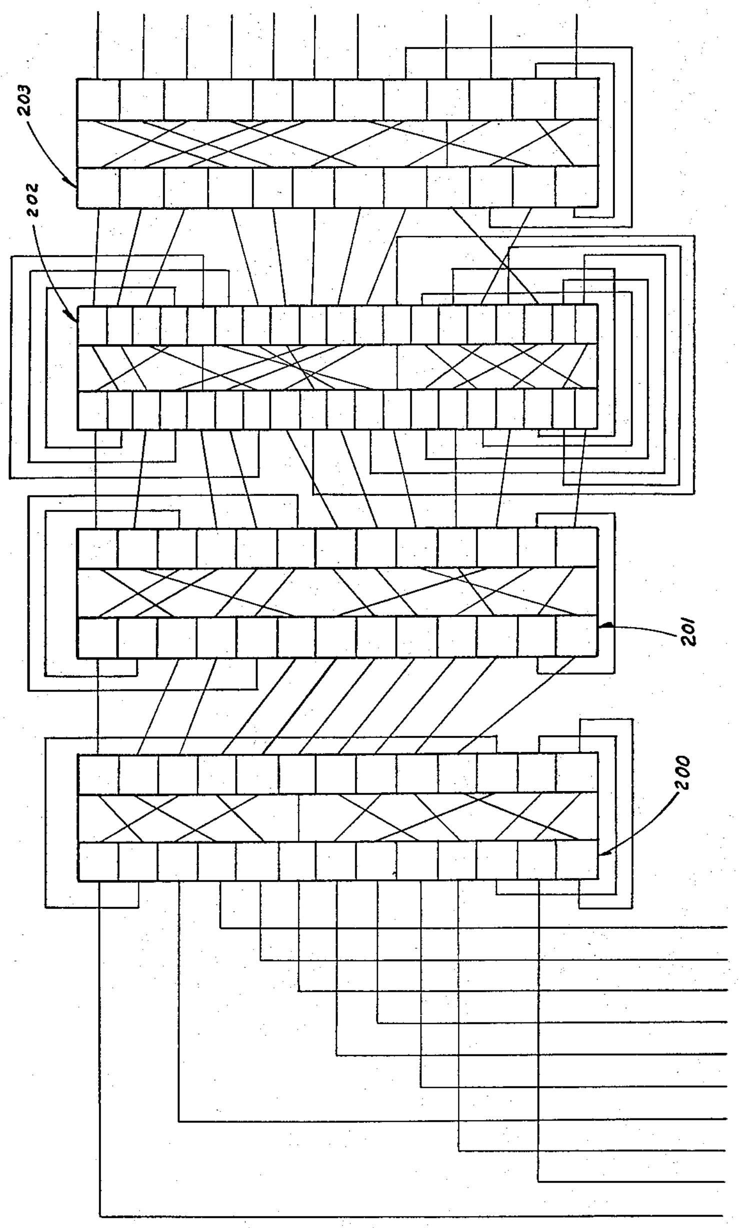
Figure 3 is a diagrammatic representation of a different form of the invention.

In Figure 3 are shown a series of four cryptographic rotors 200, 201, 202, 203 some of which have different numbers of contact segments than others. Some of the rotors, therefore, include more feed-back circuits than others. In the preferred arrangement, each of these elements will rotate at a different speed from the others, and one or more may turn in a different direction than the others. The cryptographic law or principle is extraordinarily involved.

Figure 4:
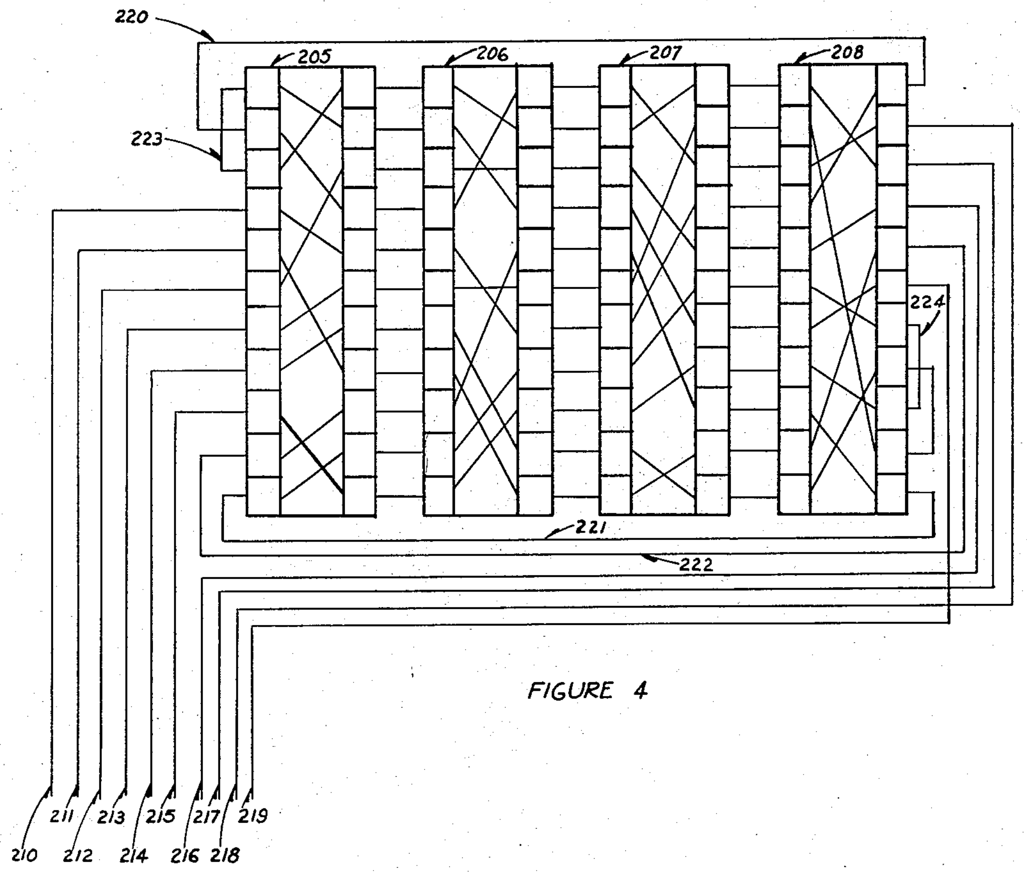
Figure 4 illustrates a further embodiment of my invention.

Figure 4 illustrates an important modification of the invention. Four rotors 205, 206, 207, and 208, essentially similar to those already described, are arranged in series. Whereas ten lines 210–219, inclusive, are provided, for ten key operations, each rotor has eleven contact segments. The exact number is not a critical consideration, except that it should be larger than one-half of the lines to be handled. Six of the input lines 210–215, inclusive, feed into one end of the rotor system, and four, 216–219, inclusive, into the other end. Any line may serve as input and output alternately. Still further, by means of conductors 220, 221, and 222, certain signals are taken from one end of the system, and reintroduced at the other, whereby these signals are caused to travel two or more times in the same direction through the entire set of rotors. Additionally, "reversing wires" 223 and 224 will cause certain signals to travel backward through the maze after going through once in the usual way. Such reversing wires may be provided at either or both ends of the rotor system. They may, of course, if desired, be omitted entirely.

The fundamental principle involved here, basic to the invention, is the provision of means for connecting in any manner desired, at either end of the machine, the keyboard wires 210–219 (Figure 4), plus a remaining group of paired wires such as 220, 221, 222 and 223. It does not matter how these wires are grouped, as long as every contact on either side has some such wire fastened to it. Previous machines of this general type required that all input-output wires be fastened to one end of the rotor system, and all paired wires be fastened to the other as reversing wires, whereas this machine permits unrestricted assignment of the input-output wires and of the paired wires. The paired wires may thus now be reversing wires at either end, or reflexing wires connecting both ends.

In Figures 3, 4, 5, and 6, neither keyboard nor indicating lights have ben shown. The signal-introducing means and output indicators of Figure 2 can be assumed for all figures. Obviously, however, other systems can be used.

Figure 5:
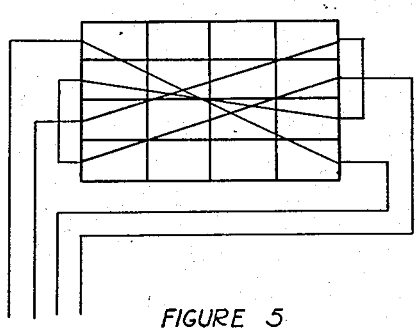
Figure 5 is a diagram of a modification of the embodiment of Figure 4.

In the diagram of Figure 5, the rotors are shown as including segments equal in number to the lines to be handled. It will be seen that under these conditions, certain signals—introduced at either end of the rotor series—may be reciphered without any feed-back external of the system.

Figure 6:
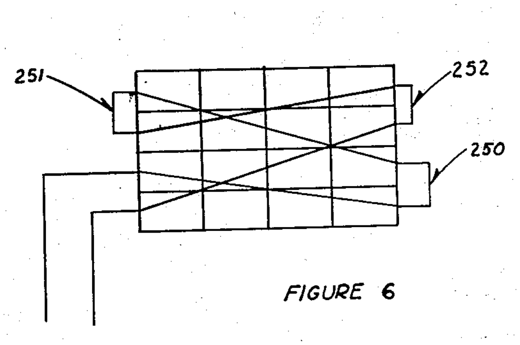
Figure 6 is a schematic representation of a still different form of the invention.

Figure 6 illustrates an additional specialized form of the invention, wherein a signal introduced over one of a plurality of input-output lines, at one end of a rotor system, is caused by reversing wires 250, 251 and 252 to travel twice in each direction through the maze before output.

Figure 7:
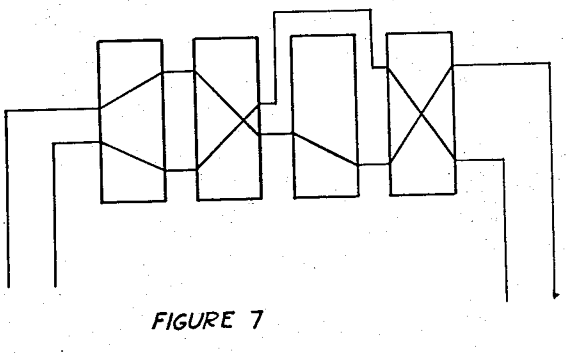
Figure 7 is a diagram of a further modification of the invention.

According to the showing of Figure 7, a signal introduced over one of a plurality of input-output lines may be enciphered by skipping one or more of the operations of the normal ciphering process as well as by reciphering. Obviously, this means can be used in conjunction with those earlier disclosed.

Figure 8:
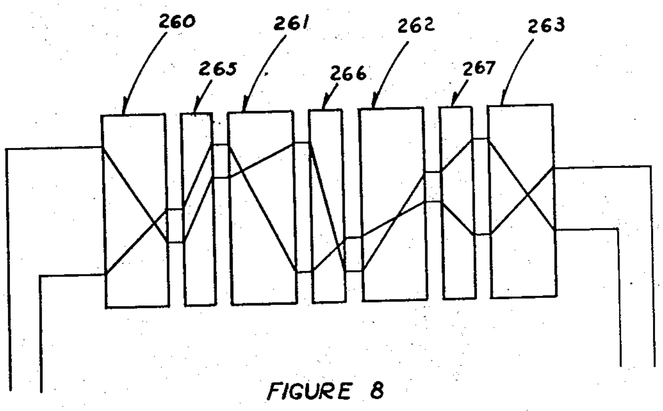
Figure 8 illustrates an additional means for increasing the complexity of the cryptographic principle involved.

In Figure 8 the rotors 260, 261, 262, and 263 are separated by non-rotating members or stators 265, 266, and 267 and are connected therethrough in random fashion. Such stators can be employed with all forms of the invention herein described and shown.

Although the description so far has been confined to electrical and mechanical means for practicing the invention, it should be understood that the methods involved can be practiced with other apparatuses, or, in fact, with none. Thus, in place of the cryptographic rotors principally relied upon in this disclosure, code books, relatively slidable cipher strips, relatively rotatable discs, and many other well known cryptographic expedients can be employed, and the steps of the various methods carried out by hand.

The above description is in specific terms, and is not to be considered as defining the limits of the invention, for the true scope of which reference should be had to the appended claims.

In the practice of this invention, decipherment is simply the reverse of enciphering; it is in other words merely one phase of enciphering. In the claims, therefore, "ciphering" and "enciphering," where used, are to be considered to include deciphering; and, as stated earlier, include as well "coding" and "decoding."

I claim:

1. In a crytopgraphic rotor, a plurality of input contacts greater in number than the input lines normally to be served, a plurality of output contacts greater in number than the output lines normally to be served, connecting means providing an electrical path between said input contacts and output contacts, and a feedback connection between a normally unused output contact and a normally unused input contact.

2. In a cryptographic rotor, a plurality of input contacts greater in number than the input lines normally to be served, a plurality of output contacts greater in number than the output lines normally to be served, connecting means providing an electrical path between said input contacts and output contacts, and a feedback connection between a normally unused output contact and a normally unused input contact, certain of the connecting means providing paths between normally used input contacts and normally unused output contacts and between normally unused input contacts and normally used output contacts.

3. In a ciphering machine, a plurality of input lines, a similar number of output lines, and a plurality of cryptographic rotors some of which are adapted for rotation and some of which are provided with input contacts and output contacts greater in number than the input and output lines, and feed-back connections between the normally unused output and input contacts of said last mentioned rotors.

4. In a cryptograph, a plurality of cryptographic switching devices having input contacts and output contacts and connections therebtween according to a predetermined rule, some of said devices being adapted for rotation, and some being provided with feed-back connections in addition to the aforementioned connections from certain of their output contacts to certain of their input contacts.

5. In a ciphering machine, a series of cryptographic rotors having input and output contacts and interconnections therebetween to provide a plurality of paths through said rotors in said series for electrical input signals, and a connection between an output contact of a rotor and an input contact of a rotor spaced from it in the series thereby by-passing a rotor.

6. In a crytograph, a series of cryptographic rotors each having two sets of contacts and interconnections therebetween providing a plurality of variable paths for electrical signals serially through said rotors, means for introducing certain signals at one end of said series to encipher the same therein, and means for introducing certain other signals at the other end of said series to encipher the same therein.

7. In a crypotograph, a series of cryptographic rotors each having two sets of contacts and randomized interconnections therebetween providing a plurality of variable paths for electrical signals serially through said rotors, means for introducing certain signals at one end of said series to encipher the same therein, means for introducing certain other signals at the other end of said series to encipher the same therein, and a connection between a contact of one set of contacts of a rotor at one end of the series and a contact of the other set of contacts of a rotor at the other end of the series thereby bypassing the rotor series.

8. In a ciphering machine, a series of cryptographic rotors each having two sets of contacts and randomized interconnections therebetween providing a plurality of variable paths for electrical signals through said rotors, a connection between two contacts of one set of contacts of a rotor at one end of the series, means for introducing certain signals at other contacts to encipher the same of said one set of contacts, and means for introducing other signals at the other end of said series to encipher the same.

9. In a ciphering machine, a series of cryptographic rotors each having two sets of contacts and randomized interconnections therebetween providing a plurality of variable paths for electrical signals through said rotors, a connection between two contacts of one set of contacts of a rotor at one end of the series, a connection between two contacts of the other set of contacts of a rotor at the other end of the series, means for introducing certain signals at one end of said series for encipherment therein, and means for introducing other signals at the other end of said series for encipherment therein.

10. In a ciphering machine, the combination of a switching device having two sets of contacts providing a plurality of variable paths for electrical signals therethrough, means connecting two contacts of one set of contacts, means connecting two contacts of the other set of contacts, means effectively external of the switching device connecting a third contact of the first set of contacts and a third contact of the other set of contacts, means for introducing certain signals to the switching devices through the remaining contacts of one set of contacts, and means for introducing other signals through the remaining contacts of the other set of contacts.

11. In a ciphering machine, the combination of a series of switching devices each having two sets of contacts providing a plurality of variable paths for electrical signals therethrough, means connecting two contacts of one set of contacts of a switching device at one end of the series, means connecting two contacts of the other set of contacts of a switching device at the other end of the series, means effectively external of the series connecting a third contact of the said one set of contacts at one end of the series and a third contact of the said other set of contacts at the other end of the series, means for introducing signals to the series through the remaining contacts of the switching device at one end of the series, and means for introducing other signals through the remaining contacts of the switching device at the other end of the series.

12. In a cryptograph adapted normally to handle a certain number of input lines and to provide signals to a similar number of output lines, a series of rotors, each rotor being provided with two sets of contacts, each set on certain rotors being at least equal in number to more than half of the lines normally to be handled, means for connecting a portion of the input lines at one end of said series of rotors, means for connecting the other input lines at the other end of said series, and a feedback connection from a contact of one of said certain rotors to a contact of another said certain rotor.

13. In a cryptograph adapted normally to handle a certain number of input lines and to provide signals to output lines equal in number to the input lines, a character displacing element including a series of cryptographic rotors each having two sets of contacts each equal in number to more than half of the lines to be handled, means for connecting some of said input lines to contacts of one set of contacts at one end of said series, and means for connecting the remainder of said lines to contacts at the other end of said series.

14. In a ciphering machine, the combination of a series of cryptographic rotors, each having two sets of contacts and randomized interconnections therebetween providing a plurality of variable paths for electrical signals therethrough, means connecting two contacts of one set of contacts of a rotor at one end of the series, means connecting two contacts of the other set of contacts of a rotor at the opposite end of the series, and means for introducing electrical signals at the other contacts of the one set of contacts of the rotor at the first mentioned end of the series.

15. In a combination in a shifting device for a cipher machine employing a varied number of characters in a ciphered text wherein the number of channels available is in excess of the number of channels required, comprising a plurality of ciphering cylinders having switch contact means for connecting the channels of one cylinder to those of another in the many relative positions said cylinders may have and circuit means connecting said excess channels of one cylinder to the excess channels of another cylinder whereby on relative displacement of the cylinders to successive positions the required channels are maintained conducting for all operating positions of the cylinders.

16. In combination a cipher device comprising a set of relatively movable cipher cylinders having through-extending electrically conducting channels and connections between the channels of the various cylinders to form paths for transmitting signs through the set of cipher cylinders, said cipher cylinders being subject to a ciphering operation, characterized in that said connections are so arranged that when a set of cipher cylinders having a given number M of through-extending conducting channels is used for transmitting a given number N of signs, N being a number smaller than M, the inlets of the M minus N unoccupied channels of the first cipher cylinder are each connected with an individual one of the exits of the M minus N unoccupied channels of the last cipher cylinder of the set of cylinders.

17. The combination set forth in claim 16, said connections between the inlets and outlets of those of said channels which are unoccupied comprising at least in part by-pass conductors external of the set of cipher cylinders.

18. In combination, a cipher device comprising a set of relatively movable cipher cylinders each having information conveying means carried thereby, transfer means between said means of the various cylinders to transmit information through the set of cipher cylinders, characterised in that said conveying means are so constructed and arranged that when a set of cipher cylinders having a given number M of said conveying means is used for transmitting a given number N of unique items of information, N being a smaller number than M, the information receiving portions of the M minus N unoccupied conveying means of the first cipher cylinder are each connected with an individual one of the delivery portions of the M minus N unoccupied conveying means of the last cipher cylinder of the set of cylinders.

References Cited in the file of this patent

UNITED STATES PATENTS

| | | |
|---|---|---|
| 1,414,496 | Beyer | May 2, 1922 |
| 1,510,441 | Hebern | Sept. 30, 1924 |
| 1,533,352 | Koch | Apr. 14, 1925 |
| 2,139,676 | Friedman | Dec. 13, 1938 |

OTHER REFERENCES

Page from Pickwick Papers. (Photostat copy, Div. 53.)